Patented June 2, 1942

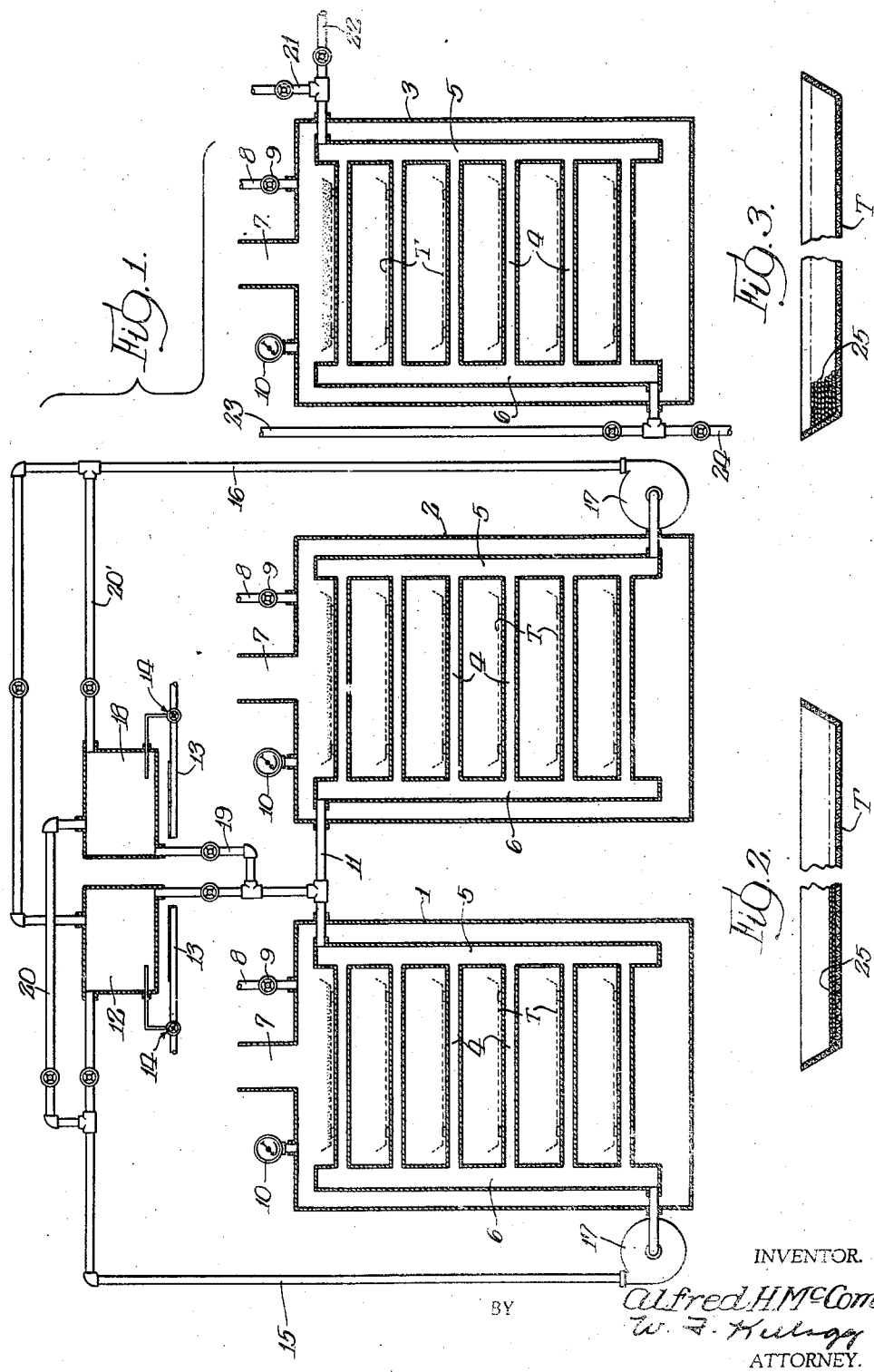

2,284,913

UNITED STATES PATENT OFFICE 2,284,913

DRYING PROCESS

Alfred H. McComb, Chicago, Ill.

Application December 9, 1939, Serial No. 308,363

16 Claims. (Cl. 99—204)

This invention relates to improvements in drying processes and, more particularly, to the process of drying organic and inorganic matters, including fruits, vegetables, fish and meats, and also the products resulting from such process.

The invention has for an object to provide a process for treating moisture containing matters, such as hereinbefore generally stated, in an efficient and economical manner whereby to thoroughly dry the same with all of their original constituents, except moisture, remaining unaltered or unimpaired therein.

Also, it is an object of the invention to provide a drying process of the indicated character by means of which matters, such as foods, may be dried and brought to conditions which will effect their preservation over prolonged periods of time.

More particularly, it is an object of the invention to provide a process for working in connection with substantially all moisture containing organic and inorganic matters, especially advantageous for usage in the drying of moisture containing food products as, for example, fruits, vegetables, fish and meats, by means of which these products will be effectually and commercially economically dried to afford products retaining their natural food values, flavors, color, and other desirable characteristics, so that with restoration of the previously removed moisture thereto, they will become definitely possessed of food value, flavor, color and other desirable characteristics of the original fresh product or products.

It is likewise an object of the invention to provide a process for drying organic and inorganic matters which, when worked in connection with foods or ingredients of foods, will effect their drying in manners which will eliminate the toughening or burning thereof and, hence, dispense with any and all need for soaking or similar treatment thereof preparatory to cooking.

Moreover, it is an object of the invention to provide a process by means of which fruits, vegetables, fish or meats, when dried by the same, may have their original moisture content restored and, when in such condition, will have recovered their original shapes and sizes, hence eliminating detrimental loss of appearance of such products as when in their fresh or undried state.

It is also an object of the invention to provide a drying process of the stated character whereby fruits, vegetables, fish, or meats dried according to its teachings will effectually cook appreciably faster than similar fresh or undried products, and which, when cooked, will have their original colors definitely enhanced and their original textures retained in manner comparable to cooked fresh products.

Yet another and highly important characteristic of the invention resides in the provision of a drying process, the practicing or working of which is at all times purely and uniformly product controlled, i. e., the drying of matters according to its teachings being so effected that the results accomplished thereby are constantly uniform, irrespective of those climatic conditions existing at the place and time of processing of said matter.

Another important desideratum of my invention may be stated to reside in the subjection of the cellular structures of those matters being treated in accordance with the same to successive or recurring stages of expansion and contraction during the course of their drying whereby to facilitate and render possible the removal of the greatest possible amount of moisture from the matters being treated without disturbing, altering, or distorting their original or natural properties and values, other than moisture; such stages of expansion of the cellular structures of the treated matter being so effected and controlled that they will be expanded only to degrees well within their respective limits of maximum expansibilities and, hence, avoid the breaking down or rupturing of such cellular structures whereby to insure effectual restoration of the treated matters, when supplied with moisture, to substantially their original or natural conditions.

By reason of long activity and experience in the art of drying, I have ascertained the many and serious difficulties which are encountered in the effectual drying of matters, particularly, fruits, vegetables and like products, such, for example, as that of effecting mass or volume drying of fruits and vegetables at commercially feasible cost; the drying of fruits or like products without destroying, or at least impairing their original values, colors, flavors, or textures; the lack of uniformity in the steps of practicing heretofore known processes, as well as the serious, oftentimes disastrous, failure or inability to secure uniformity in the dried products because of climatic conditions present at the time and place of drying; the general inability to accordingly control the extent or degree of drying of products; the undesirable oxidation or burning, toughening and disintegrating of matters being dried so that the resultant products require presoaking in liquids, or cooking over long periods of time, or both; and the production of a dried product possessing, when cooked or otherwise prepared for consumption, all of its original or fresh, or natural characteristics, including those of appearance, body consistency or structure, and biological or similar natural properties and values.

Through the medium of my process, hereinbefore referred to, it becomes possible to produce dried matters of organic or inorganic characters which entirely overcome those difficulties stated, and provide the art with a distinctly new and meritorious product.

Other objects will appear hereinafter, in part obvious and in part pointed out.

In order that the invention and its mode of operation may be understood by those skilled in the art to which it pertains, I have in the accompanying illustrative drawing and in the detailed following description based thereon, set out an embodiment of my invention.

In the drawing:

Figure 1 is a semi-schematic view of one form of apparatus capable of being used in the successful practicing of my invention; and Figures 2 and 3 are enlarged sectional views of certain of the trays for receiving and retaining the product to be dried with amounts of the product therein, at several stages of the improved process, parts of said trays being broken away.

In practicing the invention, various forms of instrumentalities may be utilized to carry the same out, although in the instant embodiment of the invention, as disclosed in the accompanying drawing, the mechanical means for such practicing of the process are shown to include conventional types of vacuum chamber dryers designated in their entireties by the numerals 1, 2 and 3, each said dryer being provided with one or more charging and discharging openings closed by doors (not shown) obviously adapted to seal such openings against leakage.

Within each of the dryers 1, 2 and 3 are superposed and spaced hollow metal shelves 4, having communication at opposite points with headers 5 and 6, respectively connected with conduits through which course heating or cooling fluids to and from the hollow shelves. Each of the dryers is equipped with a suction connection 7, communicating with a suitable vacuum pump (not shown) whereby to exhaust air from the chamber of each dryer, and an air intake 8, valved as at 9, is provided on each of said dryers for admitting properly metered quantities of air into the dryer chambers. The vacuum gage 10, appropriately mounted on each of the dryers, serves to indicate the degree of partial vacuum which may be effected therein.

As above stated, dryers of the types thus generally described are not new in this art. Therefore, the accompanying drawing has been prepared to diagrammatically indicate them in a manner to disclose one satisfactory means for carrying out or practicing the improved process, rather than detailing such mechanical instrumentalities. The interiors of the dryers, it will be noted, are indicated from one of the sides of each that are opened to receive trays, more particularly illustrated in Figures 2 and 3; it being understood that these trays are adapted to be received and supported by the aforesaid shelves 4.

Referring to Figure 1, it will be noted that the headers 5 of each of the dryers 1 and 2 are connected by conduit 11 with an oil supply source 12, the latter being heated by any suitable heating means 13, to a temperature of from 350° F. to 500° F., which heating means may be controlled by a thermostatic device 14 to maintain the oil at a predetermined and desired temperature, and return conduits 15, 16, may lead from the headers of the dryers 1 and 2, respectively, back to the oil supply tank or other source 12; suitable pumps or other force imparting means being interposed and communicating with said conduits 15, 16, to effect circulation therethrough.

A second source of oil supply or tank 18 is provided and the oil contained in this particular tank is maintained at a temperature from about 50° F. to 150° F. by means similar to those described in connection with the tank 12. Said tank 18 is likewise connected with the headers 5, 6, in the dryers 1, 2, as by a branch line or conduit 19 extending from such tank into communication with an intermediate portion of the conduit 11, and branch lines 20, 20', connecting with the conduits 15, 16, respectively. The conduits and branch lines aforesaid, are suitably valved whereby to permit the flow of oil from the tank 12, or the tank 18, as desired. In consequence, it will be understood that the shelves 4 may be supplied with oil heated from 350° F. to 500° F., or they may be supplied with oil which has been heated from 50° F. to 150° F., hence enabling a rapid and efficient control of the temperature of said shelves.

Referring to the dryer 3, instead of providing heated oil for circulation through the shelves 4 therein, as in the instance of the dryers 1 and 2, I provide for the heating or cooling of the shelves by the use of steam, or steam and water, or water only. Steam may be supplied to the header 5 of the dryer 3 by conduit 21, and a cold water conduit 22 may connect with or join the conduit 21; suitable valves, as illustrated, being provided each said conduits for controlling the passage of steam or water, or for permitting any desired admixture of both, or for permitting the flow of only one or the other to said header 5. A return conduit 23 communicates with the header 6 of the dryer 3 and is equipped with a suitably valved drain 24 connected with said conduit 23 at a point between the valve in the latter and said header 6.

From the foregoing, it will be understood, as indicated above, that any desired degree of admixture of steam and cold water may be thus effected and coursed or flowed through the shelves 4 of the dryer 3 to control the temperature thereof, up to the temperature of the steam alone, and either steam alone, or water alone, may be coursed or flowed through said hollow shelves 4.

The following description of my process relates to the drying of fresh shelled peas, and it will be understood that the identical temperatures and times given will vary somewhat, according to the product being dried and, moreover, some variations may be found desirable and in order in drying fresh shelled peas, this being due to the difficulties and those characteristics which are well known to exist between different varieties of peas.

The fresh shelled peas are first blanched in a manner customary in the art, by being subjected to the action of live steam for periods of time ranging from about five to possibly ten minutes. This blanching may be effected with the fresh shelled peas 25 arranged in the trays T (Figure 2) to depths of several layers, or possibly from two to five layers deep. Following blanching, the peas are cooled and the thus loaded trays T are placed on the shelves 4 in the dryers 1, 2, and said dryers closed, whereupon oil, at a temperature of from 350° F. to 500° F. from the source of supply or tank 12, is caused to circulate or course through said shelves, hence, raising the internal temperature of the dryers (the temperature within the dryer chambers) to a corresponding degree. Thereupon, air is exhausted from the respective dryer chambers as rapidly as possible, preferably, in periods of time from one to two minutes, until the vacuum gages 10 indicate partial vacuums in each dryer from about 25 to 29 (barometer). At this point, attention is invited to the fact that by reason of the moisture or water content of the product, said product will not be burned when it is subjected to the stated high temperatures existing within the dryers. The temperatures of the product will, of course, be raised to boiling point (212° F.) at atmospheric pressure, and the resultant vaporization of the water content thereof will, obviously, prevent its burning. Also, when the internal pressures of the dryers have been brought to below atmospheric pressures (vacuum or partial vacuum), the temperature at which the product water boils will be correspondingly lowered and the incident vaporization of such water will again prevent burning of the product. The following table will more clearly show the steps in the dryers 1, 2, from the time fresh shelled and blanched peas are placed thereon, to their removal therefrom. It should be noted, upon reference to the referred to table and those following the same, that the terms "break" and "crack" are utilized to describe two different conditions within the dryer chamber. The term "break" refers to the reduction of vacuum or partial vacuum within any one of the chamber dryers to zero. The term "crack" describes merely the reduction of a vacuum or partial vacuum existing in any of the dryer chambers, i. e., where a vacuum or partial vacuum of a certain degree is present, such degree of vacuum is definitely reduced by admitting a limited quantity of air into the dryer chamber or chambers, which will still maintain such partial vacuum above the zero degree.

The times given in the first column are cumulatively given, commencing from zero, when the peas are placed in the dryer chambers, and terminating with about 60 minutes.

STAGE 1

*Dryers 1, 2, operating individually or collectively at internal temperatures of from 350° F. to 500° F.*

| Time | Vacuum in inches |
|---|---|
| In 0 | 0. |
| At 2 minutes raise | Vacuum to 29 (take 6 minutes to raise to this vacuum). |
| At 9 minutes break | Vacuum to 0. |
| At 11 minutes raise | Vacuum to 29 (take 6 minutes to raise). |
| At 18 minutes crack | Vacuum to 28. |
| At 23 minutes raise | Vacuum to 30 (take 2 minutes to raise). |
| At 30 minutes crack | Vacuum to 28. |
| At 34 minutes raise | Vacuum to 30 (take 2 minutes to raise). |
| At 50 minutes maintain | Vacuum at 30 (cool trays by circulating oil through shelves at about 150° F. and close to flow of oil at 350° F. to 500° F.). |
| At 60 minutes break | Vacuum and remove trays from dryer. |

After the peas in the dryers 1, 2, have been removed therefrom, in the trays T, they are transferred to a lesser number of trays T, and thus, the quantities of peas in each tray are materially increased, as indicated in Figure 3; that is to say, the trays T (Figure 3) are now loaded with peas from about five to ten layers or more deep, and these reloaded trays are placed on the shelves in the dryer 3. The temperature of the shelves 4 in the dryer 3 is brought to and maintained at from about 275° F. to 280° F. or the temperature of the steam.

The following table refers to a continuance of the drying process in the dryer 3:

STAGE 2

*Dryer 3 having its shelf temperature at approximately 275° F. to 280° F.*

| Time | Vacuum in inches |
|---|---|
| In 0 | 0. |
| At 5 minutes raise | Vacuum to 30. |
| At 10 minutes break | Vacuum to 0. |
| At 15 minutes raise | Vacuum to 30. |
| At 20 minutes crack | Vacuum to 28. |
| At 25 minutes raise | Vacuum to 30. |
| At 30 minutes crack | Vacuum to 28. |
| At 35 minutes raise | Vacuum to 30. |
| At 40 minutes crack | Vacuum to 28. |
| At 45 minutes raise | Vacuum to 30. |
| At 54 minutes crack | Vacuum to 28. |
| At 55 minutes raise | Vacuum to 30. |
| At 65 minutes maintain | Vacuum at 30 (turn off steam). |
| At 70 minutes maintain | Vacuum to 30 (circulate steam mixed with cold water through shelves to commence cooling). |
| At 75 minutes maintain | Vacuum to 30 (circulate cold water only through shelves to cool product). |
| At 80 minutes break | Vacuum and remove trays from dryer. |

After the drying in dryers 1, 2, the treated product will be one containing about 50 per cent moisture and 50 per cent solids, and when the peas are removed from the dryer 3, they will be substantially bone dry. Whatever moisture remains within the peas, after treatment in the dryer 3, will be in an amount insufficient to cause mould or other deterioration of the product, though, of course, the thus treated peas will be hydroscopic in character and, in consequence, will pick up moisture from the air, unless suitably packaged. It is highly important to note that in each instance where the degree of evacuation of air from the dryers 1, 2, is increased from 28 to 30, in the first stages of drying, such increase of vacuum must be gradually effected, otherwise injury to the texture of the peas or their skins, or splitting of the peas will occur. Also, the gradual increase in the drying or effective influence of the vacuum in the dryers 1, 2, acts to accelerate the drying of moisture therefrom by more efficiently drawing moisture from the peas than where a rapid vacuum or partial vacuum increase is effected. The evacuation, however, may be more rapidly effected in the second stage.

From the foregoing, it will become apparent that one dryer may, if desired, be utilized to accomplish the entire process. However, under such producing or treating conditions, the volume of production will be decreased to a commercially undesirable degree and the product, while relatively satisfactory, is not believed to be quite as satisfactory as where there is a slight interval or breach between the period of subjecting the peas to temperatures of from 350° F. to 500° F., and the period of subjecting the peas to the second stage of lowered temperature of from 275° F. to 280° F.

The process of treating spinach, potatoes and certain other produce, according to the teaching of my invention is, in general, the same as that practiced in connection with peas, except—and as in the instance of drying peas—certain minor variations of temperatures and vacuums or partial vacuums will be effected, according to the characteristics peculiar to the matter being then dried.

The following table is an example of the process as applied to the drying of spinach:

STAGE 1

Temperature 350° F. to 450° F.

| Time | Vacuum in inches |
|---|---|
| In 0 | 0. |
| At 3 minutes raise | Vacuum to 30. |
| At 8 minutes break | Vacuum to 0. |
| At 12 minutes raise | Vacuum to 30. |
| At 17 minutes crack | Vacuum to 26. |
| At 23 minutes raise | Vacuum to 30. |
| At 25 minutes maintain | Vacuum at 30 (commence cooling to about 150° F. by circulating oil from tank 18). |
| At 35 minutes break | Vacuum and remove from dryer. |

STAGE 2

Temperature at about 275° F. (steam)

| Time | Vacuum in inches |
|---|---|
| In 0 | 0. |
| At 4 minutes raise | Vacuum to 30. |
| At 9 minutes crack | Vacuum to 25. |
| At 14 minutes raise | Vacuum to 30. |
| At 19 minutes crack | Vacuum to 25. |
| At 24 minutes raise | Vacuum to 30. |
| At 35 minutes maintain | Vacuum to 30 (turn off steam). |
| At 40 minutes maintain | Vacuum to 30 (cool with mixture of steam and cold water in shelves). |
| At 43 minutes maintain | Vacuum to 30 (cool with cold water only in shelves). |
| At 48 minutes break | Vacuum and remove from dryer. |

The following is an exemplary table for usage in the drying of rhubarb:

STAGE 1

Temperature 350° F. to 500° F.

| Time | Vacuum in inches |
|---|---|
| In 0 | 0. |
| At 5 minutes raise | Vacuum to 30 (take 3 minutes to raise). |
| At 8 minutes crack | Vacuum to 25. |
| At 12 minutes raise | Vacuum to 30 (take 2 minutes to raise). |
| At 35 minutes crack | Vacuum to 25. |
| At 36 minutes raise | Vacuum to 30 (take 1 minute to raise). |
| At 45 minutes maintain | Vacuum at 30 (close oil circulation at 350° F. to 500 °F. and circulate oil at about 150° F. to cool). |
| At 55 minutes break | Vacuum and remove from dryer. |

STAGE 2

Steam at about 275° F.

| Time | Vacuum in inches |
|---|---|
| In 0 | 0. |
| At 4 minutes raise | Vacuum to 30. |
| At 7 minutes break | Vacuum to 0. |
| At 10 minutes raise | Vacuum to 30. |
| At 20 minutes maintain | Vacuum to 30 (turn off steam). |
| At 28 minutes maintain | Vacuum at 30 (circulate cold water and steam to cool). |
| At 33 minutes maintain | Vacuum at 30 (close steam and cool with water only). |
| At 38 minutes break | Vacuum and remove from dryer. |

It may be here noted that the product placed in the heated dryers 1, 2 (Stage 1) is thoroughly heat saturated prior to the reduction of the internal pressures (degrees of vacuum) therein. Consequently, when the internal pressures of said dryers are reduced, water vapors, in proportion to the amount of heat available for vaporizing throughout the product, will be drawn from said product outwardly through the surfaces thereof. When predetermined quantities of such water vapors have been thus withdrawn, the product will have had its heat energies reduced and so, will have been cooled. Thereupon, the internal pressures of the said heated dryers are increased (the degree of vacuum reduced) as hereinbefore described, causing further heat for continued vaporization to be supplied to the product in increments sufficient for rapid vaporization of small amounts of water, but not in sufficient amounts to raise the temperature of said products to the vaporization or decomposition temperatures of the taste, odor, or color-producing ingredients of the product. The steps or cycles of pressure reduction and increase in the dryers 1, 2 are repeated until the described Stage 1 of the drying process is effected. Moreover, when the now partially dried product is loaded into the dryer 3, these alternate steps of internal pressure decrease and increase are again effected in accordance with the teachings of the hereinstated schedules of the Stage 2 of the process. It will be understood that during these described steps of drying, the supplied heat increments and the absorption of heat occurring with the increase in pressure and the decrease in pressure will cause the cell walls to be flexed as the water is removed therefrom. In consequence, rupturing of the cell structures will be prevented as the product is reduced in size and weight.

Asparagus, apricots, peaches and other fruits and vegetables, fish and meats, treated by my process in substantially the same manner as that of the treatment of peas, all require the alternate steps of subjecting the product to varying pressures (degrees of vacuum), with the application of not more than approximately 500° F. in the initial or main drying stage, and with the application of not less than approximately 275° F. in the second stage; nor, in the case of vegetables, other than tubers, and containing sugar, should the degree of vacuum be reduced below 25, in order to preserve the texture of such vegetables, in so far as their solids are concerned.

An examination of asparagus, peas, potatoes and the like, after they have been dried in accordance with my process, shows that the normal fibrous cellular structure, centrally of the product, has been substantially expanded without rupturing, leaving a relatively hollow shell, but upon cooking the dried product, the body of the vegetable fills out as solid and as full as in the normal product, before drying.

Also, in the case of peas dried according to the teachings of my process, the same are ready for eating after boiling less than seven minutes, and the peas will have filled out to their normal condition—a condition similar to that in which the peas were in their original or fresh state, in from about six to eight minutes time. Spinach, dried in accordance with my process, will require about three minutes boiling, and corn, asparagus and like vegetables, will require only a fraction of the total time required for cooking the same, when fresh. It is of interest to note, in this connection, that in each instance the color of the finished product will absolutely correspond to the color of the fresh product, when cooked, and apparently, the element or elements in the cellular structures of the produce that furnishes or furnish flavor thereto, is more accessible to being tasted after treatment by my process, than before. Thus, the flavor of the cooked dried product is found to be materially enhanced.

It will be appreciated that the submission of vegetables, such as peas, for substantially two hours to temperatures from 275° F. to about 500° F., would ordinarily result in wholly destroying the products thus treated, or in reducing the same to substantially charcoal, but with the application of vacuum, cooling action is so rapid that the products remain relatively cool during the process. The alternate admission of air to the products while being treated, between the periods when they are submitted to the influence of the high vacuum (30), causes an increase in the temperature of such products, and the absorption of air, which air takes up moisture from within the bodies and cells of the products, is then withdrawn by increasing the vacuum to its ultimate, or to about 30 inches (barometer).

By this process, and with a number of conventional dryers, each equipped with from 18 to 20 shelves, with a tray area of about 19 x 37 inches on each shelf, upwards of 40,000 pounds of peas are practically and readily dried in a 20 hour day, which is the average number of hours that a packing plant operates during a normal packing or canning season.

The apparatus illustrated in the drawing, as I have hereinbefore stated, merely represents one type of apparatus suitable for the successful practicing of my process. Blanching apparatus used for preparatory treatment is conventional and, hence, has not been shown herein, since the blanching of vegetables and the like is a well known and common expedient in the canning art.

It should be here noted that the usage of high temperatures from 350° F. to 500° F. in the first drying stage of the process works toward the accomplishment or production of a maximum quantity or volume or products during a predetermined period of time.

The use of steam, alone, with the three or more dryers, as indicated in the steam heated dryer in Figure 1, may be used; several of such dryers being connected with steam and water supplies for collective operation for the initial drying stage, and one or more dryers, separately operated, for the second or final stage.

As an example of the use of steam for the complete process, the following tables of times and vacuum are satisfactory:

STAGE 1

Temperature about 275° F.

| Time | Vacuum in inches |
|---|---|
| In 0 | 0. |
| At 3 minutes raise | Vacuum to 29 (take 6 minutes to raise). |
| At 10 minutes break | Vacuum to 0. |
| At 15 minutes raise | Vacuum to 29 (take 6 minutes to raise). |
| At 22 minutes break | Vacuum to 0. |
| At 29 minutes raise | Vacuum to 30 (take 6 minutes to raise). |
| At 32 minutes break | Vacuum to 0. |
| At 37 minutes raise | Vacuum to 30 (take 6 minutes to raise). |
| At 45 minutes break | Vacuum to 0. |
| At 49 minutes raise | Vacuum to 30 (take 2 minutes to raise). |
| At 65 minutes maintain | Vacuum at 30 (turn off steam). |
| At 71 minutes maintain | Vacuum at 30 (commence cooling with steam and cold water to lower to 150° F.). |
| At 77 minutes maintain | Vacuum at 30 (cool shelves with cold water only). |
| At 84 minutes remove trays from dryer. | |

STAGE 2

Temperature at 275° F.

| Time | Vacuum in inches |
|---|---|
| In 0 | 0. |
| At 5 minutes raise | Vacuum to 30. |
| At 13 minutes break | Vacuum to 0. |
| At 19 minutes raise | Vacuum to 30. |
| At 25 minutes break | Vacuum to 0. |
| At 30 minutes raise | Vacuum to 30. |
| At 35 minutes break | Vacuum to 0. |
| At 39 minutes raise | Vacuum to 30. |
| At 44 minutes break | Vacuum to 0. |
| At 45 minutes raise | Vacuum to 30. |
| At 57 minutes maintain | Vacuum at 30 (turn off steam). |
| At 62 minutes maintain | Vacuum at 30 (reduce temperature by steam and water to about 170° F.). |
| At 67 minutes maintain | Vacuum at 30 (cool shelves with cold water). |
| At 72 minutes break | Vacuum to 0 and remove trays. |

In the above example, where steam only is used, as in the case where higher temperatures are initially employed in stage 1 of the process, the trays in the second stage (Stage 2) are loaded with the then partially dried products to double or triple the amount (or more) carried in the trays in Stage 1. I have deemed it unnecessary to illustrate the apparatus employed where steam only is used, since it is obvious that steam, or even other heating media and cooling media may be employed instead of heated oil.

In instances where steam is utilized as the heating medium in working the process, or, for that matter, where still other heating media of similar character and temperatures are used, it necessarily follows that the quantity or volume of effected production will be smaller than that production secured from a working of the process with the high temperatures and, particularly, temperatures from 350° to 500° F., as hereinbefore described.

Moreover, I invite attention to the fact that, whereas I have, in that description going heretofore, referred to temperatures from 350° F. to about 500° F., as being employed in the first stage of drying, according to the process, it will be understood that the lesser of these temperatures (350° F.) may even be at a lower degree. For example, the degree of heat utilized in this particular stage may be at a temperature as low as 250° F., but by the usage of such lower temperatures, quantity production—a highly important factor—will not be attained and, additionally, operating at these said lower temperatures may entail other hazards as regards efficient production, such as the possibility of toughening the dried product, taste distorting it, or maybe the loss of some of its food values. Therefore, it will be understood that the usage of high temperatures, as hereinbefore set forth, is preferable, though such temperatures should not materially exceed 500° F.

Fundamentally, my improved process differs from the prior art in its method of supplying the necessary heat for vaporization of the water to be removed from the treated product as hereinbefore described.

My process utilizes conduction, radiation and convection methods of heat transfer. Yet, by its unique method of heating the product being dried, the exterior of the product is not overheated and burned or the soluble salts of the product (when food stuffs are dried thereby) displaced materially from their original location in the cells of the product.

By the usage of my improved method, as hereinbefore stated, the heat increments are used to flex the cell walls of the product during removal of moisture therefrom, whereby to prevent ruptures of the cell structures as the product is progressively reduced in size and weight. Thus, food products, in particular, dried according to the teachings of the process have their cell structures shrunken, but nevertheless ready to regain quickly the normal quantities of water, exhibit the same normal shapes as had thereby before drying and appear as the fresh products in so far as weight, color, taste and odor are concerned.

My improved process of introducing heat increments at temperatures well below those necessary for atmospheric pressure evaporation of water is safe for the quick drying of food and requires amounts of heat comparable with usual vacuum processes, but a much shorter time.

The practicing of my improved process places the heat quickly in the products. It does not require the usual conduction method to get the heat from the surface of the product into its structure; the water is, therefore, not required to flow to the surface to be dried, with the result that vaporization occurs within the product structure and the soluble salts are left in situ.

Temperatures, times, and the degrees of vacuum employed, as stated in the hereinbefore offered examples, may, of course, be somewhat varied, but it is preferable that the vacuum, when effective, should not be materially less than 25 inches (barometer) and should reach at least 30 inches (barometer) when a maximum degree of evaporation is desired.

I claim:

1. The process of drying a moisture containing food product that includes the steps of enclosing said product within an air tight chamber, maintaining the area within said chamber and around said product at an elevated temperature substantially above the boiling point of water at atmospheric pressure, continuously withdrawing the air from within said chamber while admitting air therein at a ratio between the amount withdrawn and the amount admitted to maintain a uniform relatively high partial vacuum within said chamber, then discontinuing the admission of air to within said chamber and withdrawing substantially all of the air from said chamber, and thereafter repeating the aforesaid steps of admitting air to within said chamber and discontinuing such admission and withdrawing substantially all of the air from within said chamber, while maintaining the said elevated temperature within said chamber.

2. The process of drying a moisture containing food product that includes the steps of enclosing said product within an air tight chamber, maintaining the area within said chamber and around said product at an elevated temperature substantially above the boiling point of water at atmospheric pressure, continuously withdrawing the air from within said chamber while admitting air therein at a ratio between the amount withdrawn and the amount admitted to maintain a uniform, relatively high, partial vacuum within said chamber, then slowly discontinuing the admission of air to within said chamber and withdrawing substantially all of the air from within said chamber and thereafter repeating the aforesaid steps of admitting air to within said chamber and discontinuing such admission and withdrawing substantially all of the air from within said chamber, while maintaining said elevated temperature within said chamber.

3. The process of drying a fresh vegetable that comprises the steps of blanching the vegetable, then enclosing said vegetable in an air tight chamber the area within which is at an elevated temperature of substantially not less than about 275° F. and periodically varying the pressure within said chamber, including reductions thereof to substantially zero pressure relative to atmospheric pressure while maintaining said elevated temperature and finally substantially reducing the temperature to substantially below 275° F. and increasing the air pressure within said area to atmospheric pressure and removing said product from said area.

4. The process of drying a fresh vegetable or the like that comprises the steps of blanching the vegetable, then enclosing said vegetable in an air tight chamber the area within which is at an elevated temperature between about 350° F. to 500° F. and reducing the pressure within said chamber to predetermined varying degrees of pressure below atmospheric pressure including periodic exhaustion of substantially all of the air within said chamber for predetermined periods of from about three to twenty minutes for each of such periods and finally reducing the temperature in said area to about 50° F. to 150° F. for a predetermined period of time and thereafter equalizing the pressure in said area to atmospheric pressure and removing the vegetable from the chamber.

5. The process of drying a moisture containing product that includes the steps of subjecting the product, for predetermined periods of time, to the influence of a relatively high vacuum, alternately with subjecting said product to the influence of a lesser vacuum, for predetermined periods of time, while supplying to the product increments of heat sufficient for vaporization of amounts of moisture therefrom, but not in sufficient amounts to raise the temperature of such product to the vaporization or decomposition temperatures of its natural properties.

6. The process of drying a moisture containing product that includes the steps of heat saturating said product to a moisture evaporating temperature, alternately subjecting said product to the influence of relatively high and lower degrees of vacuum, and supplying to the product during the existence of the lower degree of vacuum increments of heat sufficient for rapid vaporization of small amounts of moisture therefrom during the existence of the high degree of vacuum, but not sufficient amounts to raise the temperature of such product to the vaporization or decomposition temperatures of its natural properties.

7. The process of drying a moisture containing product that includes the steps of heat saturating said product to a moisture evaporating temperature, subjecting the product, for predetermined periods of time, to the influence of a relatively high vacuum alternately with subjecting said product to the influence of a lesser vacuum for predetermined periods of time, while supplying to the product during the existence of the lesser vacuum increments of heat sufficient for vaporization of amounts of moisture therefrom during the existence of the relatively high vacuum, but not in sufficient amounts to raise the temperature of such product to the vaporization or decomposition temperatures of its taste, odor or color-producing properties.

8. The process of drying a moisture containing product that includes the steps of bodily heating the product to a temperature less than that required to burn or decompose its natural properties, subjecting said product to the influence of a relatively high vacuum, alternately with subjecting the same to an increased pressure, and supplying heat to the product during the existence of the increased pressure in increments sufficient for vaporization of amounts of moisture therefrom during the existence of the relatively high vacuum, but not in sufficient amounts to raise the temperature of such product to the vaporization or decomposition temperatures of its natural properties.

9. The process of drying a moisture containing product that includes the steps of bodily heating the product to a temperature less than that required to burn or decompose its natural properties, subjecting said product to the influence of a relatively high vacuum, alternately with subjecting the same to an increased pressure, concurrently supplying heat to the product during existence of the increased pressure in increments sufficient for vaporization of amounts of moisture therefrom during the existence of the relatively high vacuum, but not in sufficient amounts to raise the temperature of such product to the vaporization or decomposition temperatures of its natural properties, then discontinuing the supplying of increments of heat to the product for cooling the same, and then equalizing the pressure to atmospheric pressure.

10. The process of drying a moisture containing product that includes the steps of heat saturating said product to a temperature less than that required to burn or decompose its natural properties, subjecting said product to the influence of a relatively high degree of vacuum, then subjecting the product to the influence of a comparatively lower degree of vacuum while supplying to the product during the existence of the lower degree of vacuum increments of heat sufficient for vaporization of amounts of moisture therefrom during the existence of the relatively high degree of vacuum, but not in sufficient amounts to raise the temperature of such product to the vaporization or decomposition temperatures of its natural properties, repeating the steps of subjection of said product to the relative influences of vacuum of relatively high and comparatively lower degrees and continuing the supplying of said increments of heat thereto during the existence of the comparatively lower degree of vacuum until the product is dried, discontinuing the supply of increments of heat to the product, and then equalizing the pressure about the product to atmospheric pressure and removing the same.

11. The process of drying a moisture containing product that includes the steps of heat saturating said product to a moisture evaporating temperature, subjecting said product to the influence of a relatively high degree of vacuum, then subjecting the product to a comparatively lower degree of vacuum while supplying to the product, during the existence of the comparatively lower degree of vacuum increments of heat sufficient for vaporization of moisture therefrom during the existence of the relatively high degree of vacuum, but not in sufficient amounts to raise the temperature of such product to the vaporization or decomposition temperatures of its natural properties, repeating the steps of subjection of said product to the respective influences of vacuum of relatively high and comparatively lower degrees while continuing the supply of increments of heat thereto during the existence of the comparatively lower degrees of vacuum, concluding such product subjection to vacuum of a relatively high degree, discontinuing the supplying of increments of heat to the product and cooling the same, and thereafter completely breaking said vacuum and removing the product.

12. The process of drying a moisture containing product, including a stage of heat saturating the same and alternately subjecting it to vacuum of different degrees and thereby partially drying the same, cooling the product while maintaining a predetermined degree of vacuum thereabout, then breaking the vacuum, effecting an interval of subjection of said product to atmospherical temperature and pressure, then effecting a second stage of heat saturating the product but at a temperature less than that utilized during the first stage of drying and alternately subjecting the product to vacuum of different degrees for periods of time sufficient to satisfactorily dry it, then cooling the product while maintaining the same subjected to vacuum, and finally, breaking the vacuum and removing the product.

13. The process of drying a moisture containing product, including the steps of heat saturating the product at substantially atmospherical temperature, then subjecting the product, while continuing its heat saturation, to the influence of a relatively high vacuum for predetermined periods of time alternately with subjecting said product to the influence of lesser degrees of vacuum for predetermined periods of time, the heat supplied to such product being in increments sufficient to vaporize amounts of moisture therefrom though not sufficient to raise its temperature to the vaporization or decomposition temperatures of its natural properties, continuing the subjection of the product to relatively high and lesser degrees of vacuum concurrently with the application of heat thereto until approximately fifty per cent (50%) of its original moisture content has been removed therefrom, then discontinuing the application of heat to the product and cooling it, breaking the existing vacuum and effecting an interval of subjecting of the same to atmospherical temperature and pressure, thereupon again heat saturating the product and subjecting the same, for predetermined periods of time, to the influence of a relatively high vacuum alternately with subjecting the same to the influence of a lesser degree of vacuum and maintaining the heat supplied to such product sufficient to vaporize amounts of moisture therefrom though not sufficient to raise its temperature to the vaporization or decomposition temperatures of its natural properties until such product is satisfactorily dried, then cooling the product while maintaining a predetermined degree of vacuum thereabout, and finally, breaking the vacuum and removing the product.

14. The process of drying a moisture containing product that includes the steps of subjecting the product, for predetermined periods of time, to the influence of a relatively high vacuum, alternately with subjecting said product to the influence of a lesser vacuum for predetermined periods of time, while concurrently supplying to the product increments of heat for vaporization of amounts of moisture therefrom but not in sufficient quantities to raise its temperature to the vaporization or decomposition temperatures of its natural properties, until approximately fifty per cent (50%) of the original moisture content of the product is removed therefrom, then discontinuing application of heat to the product and cooling the same, breaking the existing vacuum and allowing the product to stand at atmospheric temperature for a predetermined period of time, thereupon subjecting the product to a second stage of drying which includes a subjection, for predetermined periods of time to the influence of a relatively high vacuum alternately with subjecting the same to the influence of a lesser degree of vacuum for predetermined periods of time while concurrently supplying to the product increments of heat but at a temperature less than that used in the first stage of drying for vaporization of amounts of moisture from such product, though not in sufficient amounts to raise its temperature to the vaporization or decomposition limitation of its natural properties, until such product is satisfactorily dried, then cooling the product while maintaining its subjection to vacuum, and finally, breaking the vacuum and removing the product.

15. The process of drying a moisture containing product which includes the steps of subjecting the product, for periods of time, to the influence of a relatively high vacuum, alternately with subjecting said product to the influence of a lesser vacuum for periods of time, while concurrently supplying increments of heat to the product from a source of from approximately 275° F. upwardly, but not in amounts such as to raise the temperature of said product to the vaporization or decomposition temperatures of its natural properties.

16. The process of drying a moisture containing product, which includes supplying increments of heat to the product from a heat source of from approximately 275° F. upwardly, but not in sufficient amounts to raise the temperature of said product to the vaporization or decomposition temperatures of its natural properties and concurrently alternatingly subjecting to it vacuum of different degrees, thereby partially drying the same, cooling the product while maintaining a predetermined degree of vacuum thereabout, then breaking the vacuum and effecting an interval of subjection of said product to atmospheric temperature and pressure, before effecting a second stage of heat saturating the product by supplying increments of heat thereto from a heat source of less than 275° F. but not in sufficient amounts to raise the temperature of said product to the vaporization or decomposition temperatures of its natural properties, while concurrently alternately subjecting the product to vacuum of different degrees for a time sufficient to effect further drying of said product, then cooling the product while maintaining the same subjected to vacuum, and finally, breaking the vacuum and removing the product.

ALFRED H. McCOMB.